(12) United States Patent
Schlichte et al.

(10) Patent No.: US 11,733,193 B2
(45) Date of Patent: Aug. 22, 2023

(54) HEAT TONE SENSOR AS WELL AS MEASURING ELEMENT FOR A HEAT TONE SENSOR

(71) Applicant: Dräger Safety AG & Co. KGaA, Lübeck (DE)

(72) Inventors: Mladen Schlichte, Lübeck (DE); Peter Tschuncky, Lübeck (DE); Jürgen Osswald, Hamburg (DE); Sebastian Schröter, Lübeck (DE); Tim Gnoerrlich, Lübeck (DE); Martin Schrader, Stockelsdorf (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 1273 days.

(21) Appl. No.: 16/217,529

(22) Filed: Dec. 12, 2018

(65) Prior Publication Data
US 2019/0178827 A1 Jun. 13, 2019

(30) Foreign Application Priority Data

Dec. 13, 2017 (DE) ..................... 10 2017 011 530.3

(51) Int. Cl.
*G01N 25/22* (2006.01)
*G01N 27/16* (2006.01)
*G01N 25/32* (2006.01)
*G01N 25/38* (2006.01)

(52) U.S. Cl.
CPC ............. *G01N 27/16* (2013.01); *G01N 25/32* (2013.01); *G01N 25/385* (2013.01)

(58) Field of Classification Search
CPC ....... G01N 27/16; G01N 25/32; G01N 25/385
See application file for complete search history.

(56) References Cited

U.S. PATENT DOCUMENTS

| 6,591,872 B2 * | 7/2003 | Wagenheim | .......... A61M 16/12 141/105 |
| 2005/0042141 A1 * | 2/2005 | Otani | ..................... G01N 27/16 422/98 |
| 2006/0053862 A1 * | 3/2006 | Mayer | .............. G01N 33/54373 73/1.02 |

(Continued)

FOREIGN PATENT DOCUMENTS

| CN | 1084970 A | 4/1994 |
| CN | 1615433 A | 5/2005 |

(Continued)

OTHER PUBLICATIONS

Chinese textbook having the English translated title of Scientific Equipment Trial Textbook Mechanical and Electrical Engineering Part One vol. 1 Basic Knowledge of Mechanical Products, Jun. 30, 1982, pp. 329-332.

*Primary Examiner* — Christopher P Mcandrew
*Assistant Examiner* — Zannatul Ferdous
(74) *Attorney, Agent, or Firm* — McGlew and Tuttle, P.C.

(57) ABSTRACT

A heat tone sensor includes a housing with a gas inlet and with a gas outlet as well as a device for generating a gas stream of a gas to be tested between the gas inlet and the gas outlet. A measuring element, around and/or through which the gas stream flows, is configured to catalytically burn at least a portion of the gas stream and to send a measurement signal. The measurement signal indicates a quantity of heat released in the process.

20 Claims, 2 Drawing Sheets

(56) References Cited

U.S. PATENT DOCUMENTS

| | | | | |
|---|---|---|---|---|
| 2006/0141835 A1* | 6/2006 | Weyl | ................ | H01B 7/02 |
| | | | | 439/210 |
| 2007/0000897 A1* | 1/2007 | Ingle | ................ | H01L 21/31612 |
| | | | | 257/E21.546 |
| 2011/0036069 A1* | 2/2011 | Hahn | ................ | F02D 41/1494 |
| | | | | 60/276 |
| 2011/0061526 A1* | 3/2011 | Wackerle | ............. | F04B 45/047 |
| | | | | 92/96 |
| 2013/0202490 A1 | 8/2013 | Unger et al. | | |
| 2013/0289368 A1* | 10/2013 | Covington | ............. | A61B 1/041 |
| | | | | 600/109 |

FOREIGN PATENT DOCUMENTS

| | | | |
|---|---|---|---|
| CN | 1683913 A | 10/2005 | |
| CN | 103109173 A | 5/2013 | |
| CN | 105229451 A | 1/2016 | |
| CN | 105424749 A | 3/2016 | |
| DE | 10 46 916 B | 12/1958 | |
| DE | 2 49 968 A1 | 9/1987 | |
| DE | 199 26 285 A1 | 12/2000 | |
| DE | 101 12 450 A1 | 9/2002 | |
| DE | 10 2004 056 615 A1 | 6/2006 | |
| DE | 10 2005 003 049 B3 | 6/2006 | |

\* cited by examiner

HEAT TONE SENSOR AS WELL AS MEASURING ELEMENT FOR A HEAT TONE SENSOR

CROSS REFERENCE TO RELATED APPLICATIONS

This application claims the benefit of priority under 35 U.S.C. § 119 of German Application 10 2017 011 530.3, filed Dec. 13, 2017, the entire contents of which are incorporated herein by reference.

TECHNICAL FIELD

Exemplary embodiments pertain to a heat tone sensor as well as to a measuring element for a heat tone sensor.

BACKGROUND

Heat tone sensors are used to detect (organic) gases in possibly explosive atmospheres. Usual heat tone sensors have a heating measuring wire, which is jacketed by a pellistor bead. The pellistor bead consists of a ceramic material and a catalytically active material, with which the gases to be detected can react. Heat of reaction is released during the reaction of a gas with the catalytically active material, and this heat of reaction brings about a change in the temperature as well as a measurable change in the resistance in the heating measuring wire.

Ambient atmospheres that are to be monitored or measured often contain not only one gas, but a mixture of different gases. These are reacted by conventional heat tone sensors at different rates. This is due, among other things, to the fact that molecules of different sizes can penetrate at varying degrees into the interior of the pellistor ceramic and reaction products of different sizes are also removed at varying degrees. If a reaction of a gas component takes place on the outer surface only, the heat of reaction generated contributes to a lesser extent to the measurement results than it does in the case of a reaction taking place in the interior of the pellistor bead.

The lower explosion limit of a gas mixture atmosphere is therefore reached differently depending on the species of the gas. Incorrect measurements may now occur if the heat tone sensor was calibrated for the incorrect gas. Heat tone sensors are therefore usually calibrated in practice for excessively low values, i.e., they are deliberately miscalibrated in order to guarantee safety. This may lead, e.g., to premature warnings or to plants being switched off needlessly.

SUMMARY

Therefore, there is a need for providing an improved heat tone sensor.

A first exemplary embodiment pertains to a heat tone sensor. The heat tone sensor comprises a housing with a gas inlet and with a gas outlet as well as a device for generating a gas stream of a gas to be tested between the gas inlet and the gas outlet The heat tone sensor thus comprises an active gas supply and gas removal. The gas to be tested may comprise one or more chemical substances or gaseous phases thereof. The gas inlet as well as the gas outlet are two openings in the housing of the heat tone sensor, which make possible the entry of the gas to be tested into the housing and the discharge of the gas being tested from the housing. The device for generating the gas stream may be any device that can generate a gas stream between the gas inlet and the gas outlet actively (and in a controlled manner). The heat tone sensor further comprises a measuring element, around and/or through which the gas stream flows and which is configured to catalytically burn (catalytically oxidize or chemically oxidize by means of a catalyst—catalytically combust) at least a portion of the gas stream and to send a measurement signal that indicates a quantity of heat being released in the process.

Based on the gas stream generated by the device for generating the gas stream and on the convective transportation of substances associated therewith, substance- and gas-specific diffusion coefficients have only a slight effect on the rate and effectiveness with which molecules of the gas to be tested reach a catalytically active material (i.e., a material that acts as a catalyst for the oxidation of the gas to be tested) of the measuring element in order to be burnt catalytically there. The better the gas to be tested flows through the catalytically active material, the lesser is consequently the significance of the effect that smaller molecules are reacted to an increased extent in the interior of the catalytically active material and larger molecules are reacted on the surface or in near-surface areas of the catalytically active material. Even an active flow around the catalytically active material can diminish the significance of the effect. Even an active flow of the catalytically active material can further diminish the significance of the effect. Contrary to purely diffusion-controlled heat tone sensors, the heat tone sensor being proposed therefore offers essentially identical or very similar sensitivity for different gases to be tested and substances contained in them.

The measurement signal shows a physical variable or a change in a physical variable, which characterizes the quantity of heat released during the catalytic combustion of the gas stream. The measurement signal may indicate, for example, an absolute temperature in the measuring element, a temperature increase in the measuring element, an electrical resistance of a heating element of the measuring element or a power consumption of a heating element of the measuring element. Based on the improved flow of the gas being tested around or through the measuring element, a concentration of at least one combustible substance in the gas being tested can be determined on the basis of the measurement signal in a substance-independent or gas-independent manner with increased reliability.

According to some exemplary embodiments, the device for generating the gas stream may be, for example, a pump. A pump is a device that converts driving energy into kinetic energy of the gas being tested in order thus to generate the gas stream between the gas inlet and the gas outlet. A pump may therefore also be defined in the sense of this description as a compressor or as a blower. The pump may be configured, for example, as a micropump, i.e., a pump with reduced overall size (e.g., with the use of a MicroElectro-Mechanical System, MEMS in English).

In some exemplary embodiments, the pump comprises, e.g., a diaphragm and at least one piezoelectric actuator. The piezoelectric actuator is configured here to excite the vibrations to generate the gas stream. In other words, the pump may be configured as a piezo pump, i.e., as a piezo micropump. The gas stream can be generated continuously and with reduced energy consumption in this manner.

It is obvious in this connection that the aforementioned examples for the device for generating the gas stream are purely exemplary and the device for generating the gas stream is not limited to the concretely described exemplary embodiments. The device for generating the gas stream may also be, as an alternative, any other device that can actively generate a gas stream between the gas inlet and the gas outlet.

According to some exemplary embodiments, a cross-sectional area of the gas inlet at right angles to a flow direction of the gas stream is larger than a cross-sectional area of the gas stream (at right angles to the flow direction) immediately before (immediately upstream of) the measuring element is reached. In other words, the cross section of the gas stream tapers from the gas inlet to the measuring element. It can be ensured in this manner that the gas stream is not limited by the gas inlet. The gas stream can correspondingly reach the measuring element essentially unhindered.

The gas to be tested is suctioned in some exemplary embodiments via the gas inlet directly from an ambient atmosphere surrounding the heat tone sensor. In other words, the gas to be tested is not suctioned in from a prechamber or the like into the area of the measuring element, but directly from the gas atmosphere surrounding the heat tone sensor.

According to some exemplary embodiments, the measuring element is further configured to catalytically burn the gas stream completely within the measuring element. The measuring element is thus dimensioned such that the catalytic reaction of the gas stream can take place completely in the measuring element. This can be achieved, for example, by a corresponding size (e.g., extension along the flow path of the gas stream), a corresponding porosity or a corresponding ability of the gas to flow through the catalytically active material of the measuring element (e.g., a pellistor bead).

The measuring element is therefore configured in some exemplary embodiments for the gas stream to flow through it (at least partially). If flow through the measuring element or the catalytically active material of the measuring element is possible, the effect that smaller molecules are reacted to an increased extent in the interior of the catalytically active material and larger molecules on the surface or in near-surface areas of the catalytically active material can be significantly diminished. The sensitivity of the measuring element may thus be essentially identical or very similar for different gases to be tested.

According to some exemplary embodiments, the heat tone sensor may further comprise a sensor, which is configured to send a second measurement signal, which indicates a change in a predefined physical variable in an area surrounding the heat tone sensor. Changes in the ambient atmosphere surrounding the heat tone sensor can be detected by means of the sensor and they can correspondingly be taken into account in the determination of the concentration of the at least one combustible substance in the gas being tested. For example, the predefined physical variable may be a temperature, an air pressure or gas pressure or the humidity of the air. The sensor may be configured, e.g., like the measuring element, but have, contrary to this, a catalytically inactive material (e.g., a material that does not act as a catalyst for the oxidation of the gas to be tested) instead of the catalytically active material. As an alternative, the sensor may be, e.g., a temperature sensor, a pressure sensor or a moisture sensor (hygrometer).

As was already suggested above, the heat tone sensor may further comprise in some exemplary embodiments an analyzing circuit, which is configured to determine a concentration of at least one combustible substance in the gas being tested on the basis of the measurement signal relative to a lower explosion limit (LEL) of a calibrating gas. The LEL designates the minimum concentration of a combustible substance in air, at which an explosive gas atmosphere is present. By relating the concentration of the at least one combustible substance in the gas being tested to the LEL of the calibrating gas, a substance-independent concentration of the combustible substance, which is easily understandable for a user, can be determined in the gas atmosphere being monitored. The calibrating gas may be any suitable or desired reference gas (e.g., methane). The analyzing circuit may have, e.g., one or more processors or one or more processor cores, an application-specific integrated circuit (English ASIC=Application-Specific Integrated Circuit), an integrated circuit (English IC=Integrated Circuit), a system on a chip (English SoC=System on a Chip), a programmable logic element or a field-programmable gate array with a microprocessor (English FPGA=Field Programmable Gate Array), on which software for the determination of the concentration of the at least one combustible substance in the gas to be tested runs. The analyzing circuit may further have one or more memories, in which, e.g., the software for the determination of the concentration of the at least one combustible substance in the gas to be tested or other data may be stored. The determination or calculation of the concentration of the at least one combustible substance in the gas being tested based on the quantity of heat released during the catalytic combustion, which the measurement signal indicates, may be carried out according to known principles or calculation methods.

According to some exemplary embodiments, the analyzing circuit may further also be configured to determine the concentration of the at least one combustible substance in the gas being tested based on the second measurement signal. Changing conditions in the area surrounding the heat tone sensor can thus also be taken into consideration during the determination of the concentration of the at least one combustible substance in the gas being tested. The accuracy or reliability of the determined concentration of the at least one combustible substance in the gas being tested can be increased thereby.

The measuring element may also send a plurality of measurement signals in some exemplary embodiments. The measuring element may be configured, for example, to send at least one additional measurement signal, which indicates the quantity of heat released during the catalytic combustion, the measurement signal and the at least one additional measurement signal being based on measurements in different positions in a catalytically active material of the measuring element. The analyzing circuit may then further be configured to determine an area of the measuring element with maximum quantity of released heat on the basis of the measurement signal and the at least one additional measurement signal. The measurement signal and the at least one additional measurement signal may be, e.g., measurement signals of two temperature sensors, which are arranged in different positions in the catalytically active material of the measuring element. The spatial resolution may make it possible, for example, to distinguish different classes of substances. Further, a drift of the area with the maximum quantity of released heat, i.e., the reaction area, away from an area of the measuring element located close to the gas inlet towards an area closer to the gas outlet is a sign of aging and/or poisoning of the catalytically active material. The determined area of the measuring element with maximum quantity of released heat may correspondingly indicate an imminent end of the useful life of the measuring element.

As was already suggested above, the measuring element may be a pellistor according to some exemplary embodiments. The pellistor comprises a (wound) wire, through which a heating current flows and which is enclosed by a ceramic. The ceramic is coated with catalytically active material. The heat generated during the catalytic combustion of the gas being tested penetrates to the wire, which changes the resistance thereof based on the heating. The change in the resistance is proportional to the change in the temperature of the wire as a consequence of the quantity of heat released during the catalytic combustion, which itself is proportional to the rate of reaction and hence to the concentration of the at least one combustible substance in the gas being tested.

In some exemplary embodiments, the measuring element may also be one of the measuring elements for a heat tone sensor, which will be described below. The possibility of flow through the measuring elements may be improved compared to conventional pellistors. The sensitivity of the measuring elements for different gases to be tested can thus be further equalized.

Exemplary embodiments of a measuring element for a heat tone sensor comprise a jacketing (jacket) with an inlet opening for a gas to be tested and with an outlet opening for the gas being tested. The measuring element further comprises a catalytically active material, which is introduced into the jacket in an area between the inlet opening and the outlet opening. The measuring element can make possible the guiding of a gas stream through the catalytically active material, i.e., a flow through the catalytically active material, because the catalytically active material is arranged in the flow path of the gas to be tested between the inlet opening and the outlet opening. The effect seen in conventional pellistors that smaller molecules are reacted to an increased extent in the interior of the catalytically active material and larger molecules on the surface or in near-surface areas of the catalytically active material can be significantly reduced hereby. The sensitivity of the measuring element for different gases to be tested may thus be essentially identical or very similar.

The jacket may have basically any desired form that ensures that the largest possible volume of the gas to be tested will flow through the catalytically active material. The jacket may be, e.g., tubular in some exemplary embodiments (i.e., the jacket may be a tube). The diameter of the tube may be, e.g., in the range of a few mm (e.g., 3 mm to 7 mm) or a few cm (e.g., 1 cm to 3 cm).

The jacket may be manufactured from any material that withstands temperatures at which the catalytic combustion of the gas to be tested takes place. According to some exemplary embodiments, the jacket may consist of, e.g., stainless steel or quartz glass.

According to some exemplary embodiments, the measuring element further comprises a device for heating at least a part of the jacket. The activation energy needed for the catalytic combustion of the gas to be tested can thus be provided in the form of thermal energy. The heating device may comprise, for example, a ring heater, i.e., a ring-shaped heating coil with one or more turns, which is arranged around the tubular jacket.

In some exemplary embodiments, the device for heating at least a part of the jacket is configured to set a heat output based on a measured value of a temperature sensor. The heat output can thus be set depending on a temperature of the gas being tested and a stable temperature of the gas being tested can thus be achieved on entry into the catalytically active material. The temperature sensor may be arranged, for example, on the jacket or in a catalytically inactive material and more rapid and more accurate response to temperature fluctuations can thus be made possible. The area in which the catalytically inactive material is arranged may be used for temperature equalization. For example, the ring heater may correspondingly be arranged around the area in which the catalytically active material is arranged.

The temperature in the area in which the catalytically active material is arranged may, moreover, be used to distinguish different substances in the gas to be tested. Different temperatures can be set for this, because the catalytic combustion starts at different temperatures depending on the substance. The device for heating at least a part of the jacket may correspondingly be configured according to some exemplary embodiments to heat the catalytically active material (or the gas stream) at a first time to a first predefined temperature and to heat the catalytically active material (or the gas stream) to a second predefined temperature at a second time. The first predefined temperature may be selected, for example, such that the catalytic combustion can take place for a possible first substance in the gas being tested, and the second predefined temperature may be selected such that the catalytic combustion can take place for a possible second substance in the gas being tested. The measurement results obtained at the different temperatures may also be used to correct measured values in order to further increase the uniformity of the sensitivity of the measuring element.

The measuring element comprises in some exemplary embodiments at least one temperature sensor, which is arranged in the catalytically active material and is configured to send a measurement signal based on a temperature of the catalytically active material. One or more measurement signals, which indicate the quantity of heat released by the catalytic combustion of the gas being tested in one position or in a plurality of positions (along the flow path of the gas being tested through the catalytically active material), can thus be provided by the measuring element. For example, a position with maximum heat tone, i.e., with maximum quantity of released energy, can thus be determined. This spatial resolution may be used to distinguish different classes of substances in the gas being tested or as indications of the aging and/or poisoning of the catalytically active material.

According to some exemplary embodiments, the extension of the catalytically active material along a flow path of the gas to be tested between the inlet opening and the outlet opening may be at least 3 times, 5 times, 7 times or 10 times the extension of the catalytically active material at right angles to the flow path. Complete catalytic reaction or combustion of the gas to be tested, which is stable over the long term, can be made possible due to the long passage of the gas being tested through the catalytically active material. The long passage of the gas being tested through the catalytically active material may, moreover, make it possible to improve the detection of the heat tone, i.e., the energy being released, compared to conventional pellistors.

Some examples of devices and/or processes will be explained in more detail below merely as examples with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
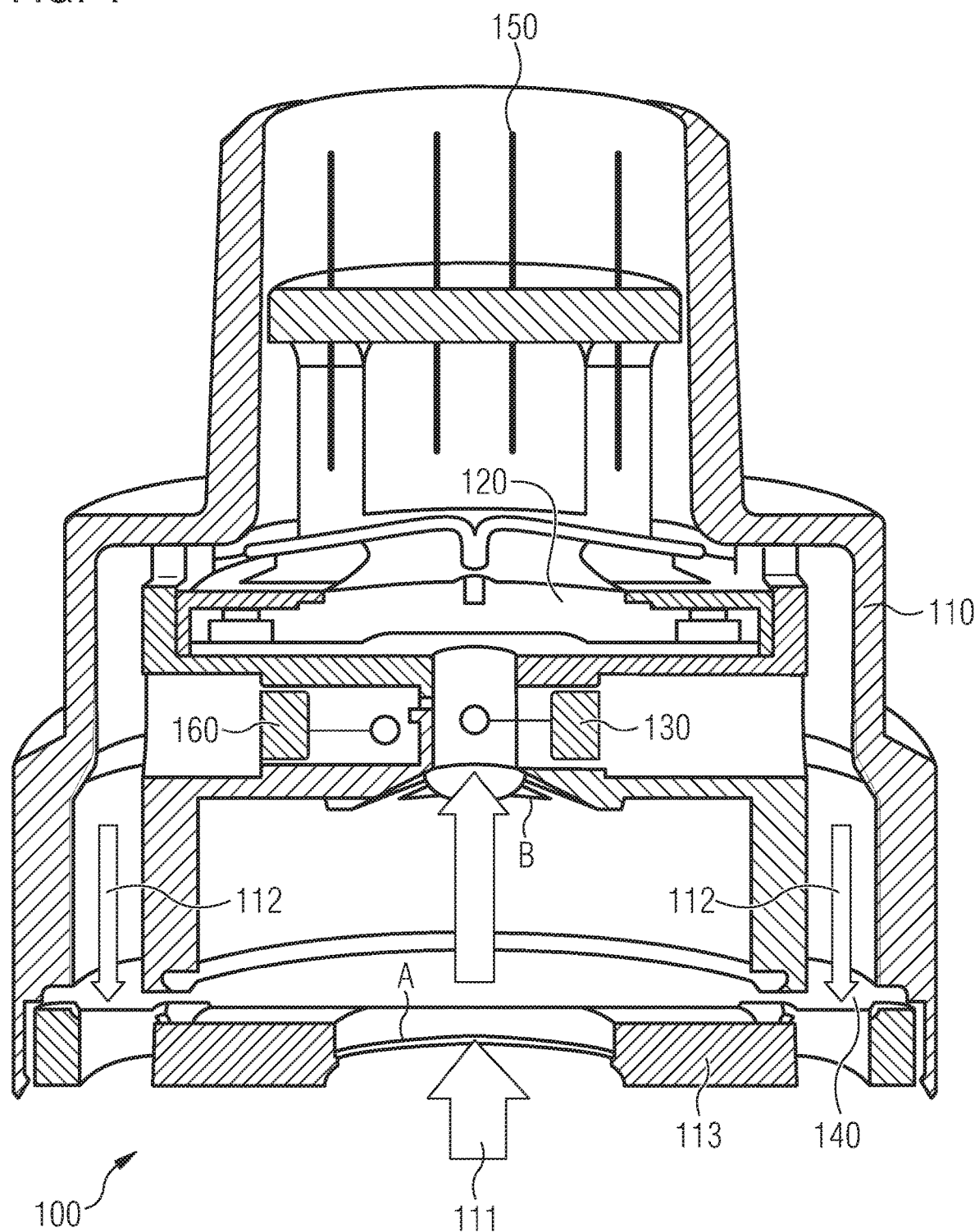
FIG. 1 is a sectional view showing an exemplary embodiment of a heat tone sensor.

Referring to the drawings, different examples will now be described in more detail with reference to the attached figures, in which some examples are shown. The boldness of lines, layers and/or areas may be exaggerated for illustration in the figures.

While further examples are suitable for various modifications and alternative forms, some particular examples thereof are correspondingly shown in the figures and will be described in detail below. However, this detailed description does not limit further examples to the particular forms described. Further examples may cover all the modifications, correspondences and alternatives that fall within the scope of the disclosure. In the entire description of the figures, identical reference numbers designate identical or similar elements, which may be implemented identically or in a modified form in a comparison with one another, while they provide the same function or a similar function.

It is obvious that if an element is described as being "connected" or "coupled," the elements may be connected or coupled directly, or via one or more intermediate elements. If two elements A and B are combined with the use of an "oder," this shall be defined such that all possible combinations are disclosed, i.e., only A, only B as well as A and B. An alternative wording for the same combinations is "at least one of A and B." This also applies to combinations of more than two elements.

The terminology that is used here to describe certain examples shall not be a limiting terminology for further examples. If a singular form, e.g., "a, an" and "the" is used and the use of only one single element is not defined as being obligatory either explicitly or implicitly, further examples may also use plural elements in order to implement the same function. If a function is described below as being implemented with the use of a plurality of elements, further examples may implement the same function with the use of a single element or a single processing entity. It is, moreover, obvious that the terms "comprises," "comprising," "has" and/or "having," when used, specify the presence of the indicated features, integers, steps, operations, processes, elements, components and/or a group thereof, but they do not rule out the presence or the addition of one or more other features, integers, steps, operations, processes, elements, components and/or a group thereof.

Unless defined otherwise, all terms (including technical and scientific terms) will be used here in their usual meanings in the field in which they are used in the field to which examples belong.

FIG. 1 shows a heat tone sensor 100. The heat tone sensor 100 comprises a housing 110 with a gas inlet 111 and with a gas outlet 112. The gas inlet 111 and the gas outlet 112 pass through a perforated plate 113 of the housing 110 as well as a flame arrester 140, whereas the gas outlet 112 extends concentrically around the gas inlet 111.

The heat tone sensor 100 further comprises a device 120 for generating a gas stream of a gas to be tested between the gas inlet 111 and the gas outlet 112. The gas to be tested is suctioned in via the gas inlet 111 directly from an ambient atmosphere surrounding the heat tone sensor 100. The device 120 for generating a gas stream is embodied in the form of a piezoelectric pump 120. A piezoelectric actuator of the piezoelectric pump 120 is configured to excite a diaphragm of the piezoelectric pump 120 to perform vibrations in order to generate the gas stream. The piezoelectric pump 120, located in the upper area of the gas sensor, thus actively delivers the gas to be tested from the gas inlet via a detecting measuring element 130 to the gas outlet 112.

As is seen in FIG. 1, a cross-sectional area A of the gas inlet 111 at right angles to a flow direction of the gas stream is larger than a cross-sectional area B of the gas stream at right angles to the flow direction immediately before reaching the measuring element 130. It can thus be ensured that the gas inlet 111 does not limit the gas stream and the gas stream can reach the measuring element 130 unhindered.

The gas stream thus flows around and/or through the measuring element 130. The measuring element 130 is correspondingly configured to catalytically burn at least a portion of the gas stream and to send a measurement signal, which indicates a quantity of heat released during the catalytic combustion. The measuring element 130 is configured as a pellistor in the example shown in FIG. 1. The measurement signal may be sent, e.g., via the terminal 150 and correspondingly analyzed by an analyzing circuit (not shown). The measurement signal may indicate, e.g., a change in the resistance of the heating measuring wire of the pellistor.

The heat tone sensor 100 further comprises a sensor 160, which is configured to send a second measurement signal, which indicates a change in a predefined physical variable in an area surrounding the heat tone sensor 100. The sensor 160 has a configuration similar to that of the measuring element 130, but, unlike this, it uses a catalytically inactive material instead of a catalytically active material. The second measurement signal can likewise be sent via the terminal 150. The second measurement signal may be used to compensate changes in the surrounding area. The gas stream flows around and/or through the second sensor 160 just like it flows around and/or through the measuring element 130. As an alternative, the sensor 160 may also have, instead of the catalytically inactive material, a catalytically active material, which has a markedly reduced sensitivity compared to that of the catalytically active material of the measuring element 130 because of reduced accessibility.

The heat tone sensor 100 (as an example of a catalytic gas sensor) thus makes it possible to actively feed the gas to be tested to the measuring element as well as to remove the combustion products through a separate outlet at the gas sensor. As is shown in FIG. 1, this may take place by a pumping operation or by convection. Obstacles to the transport of substances as they occur in usual heat tone sensors, especially in the case of long-chain or higher-molecular-weight hydrocarbons, can thus be avoided or overcome. The heat tone sensor 100 makes possible a correct and substance-independent determination of the concentration of one or more combustible substances in the gas to be tested (e.g., relative to an LEL of a calibrating gas) based on a uniform sensitivity ratio for different substances in the gas atmosphere to be monitored. The active delivery of the gas to be tested makes possible an essentially substance-independent catalytic reaction or combustion of the gas to be tested.

Figure 2:
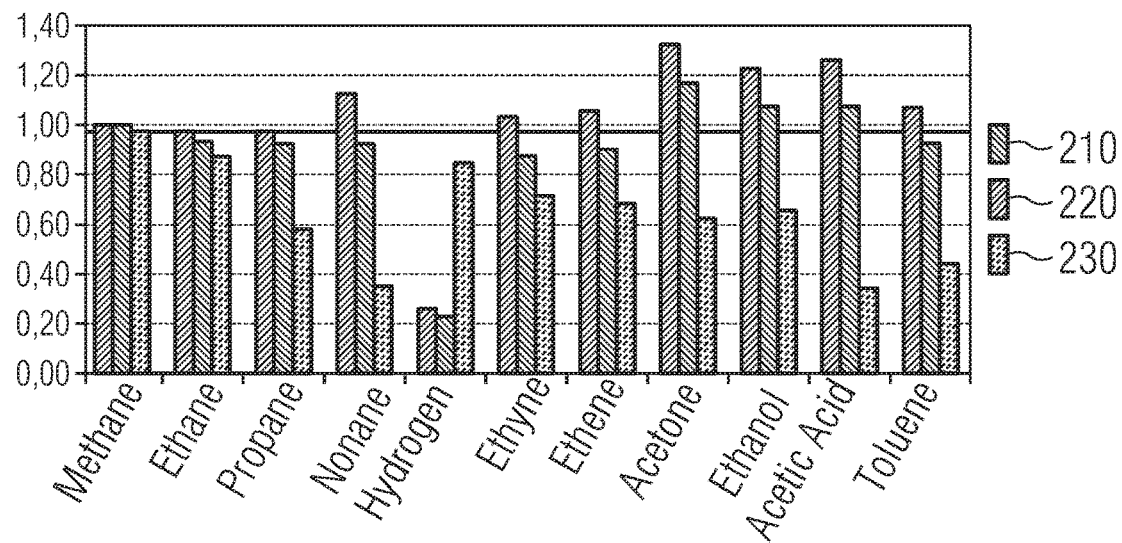
FIG. 2 is a graph showing a comparison of the sensitivities of heat tone sensors with respect to different gases.

This is shown as an example for some substances in FIG. 2. The bars 210 and 220 show each the sensitivity of heat tone sensors, which utilize an active delivery of the gas to be tested with the use of a pump according to the technique being proposed. The bars 230 show as a reference the sensitivity of a usual heat tone sensor, which operates in a purely diffusion-controlled manner. The sensitivities shown are always standardized for the sensitivity for methane (i.e., the sensitivity for methane equals one).

It is seen in FIG. 2 that the sensitivities for different chemical substances are essentially equalized and equal approximately one based on the convective operation of the heat tone sensor being proposed. For example, a value of about one is obtained for n-nonane for the heat tone sensors being proposed, while the conventional heat tone sensor has a sensitivity ratio of about 1:3. The sensitivity for different substances is thus made considerably uniform in the case of the heat tone sensors being proposed.

Figure 3:
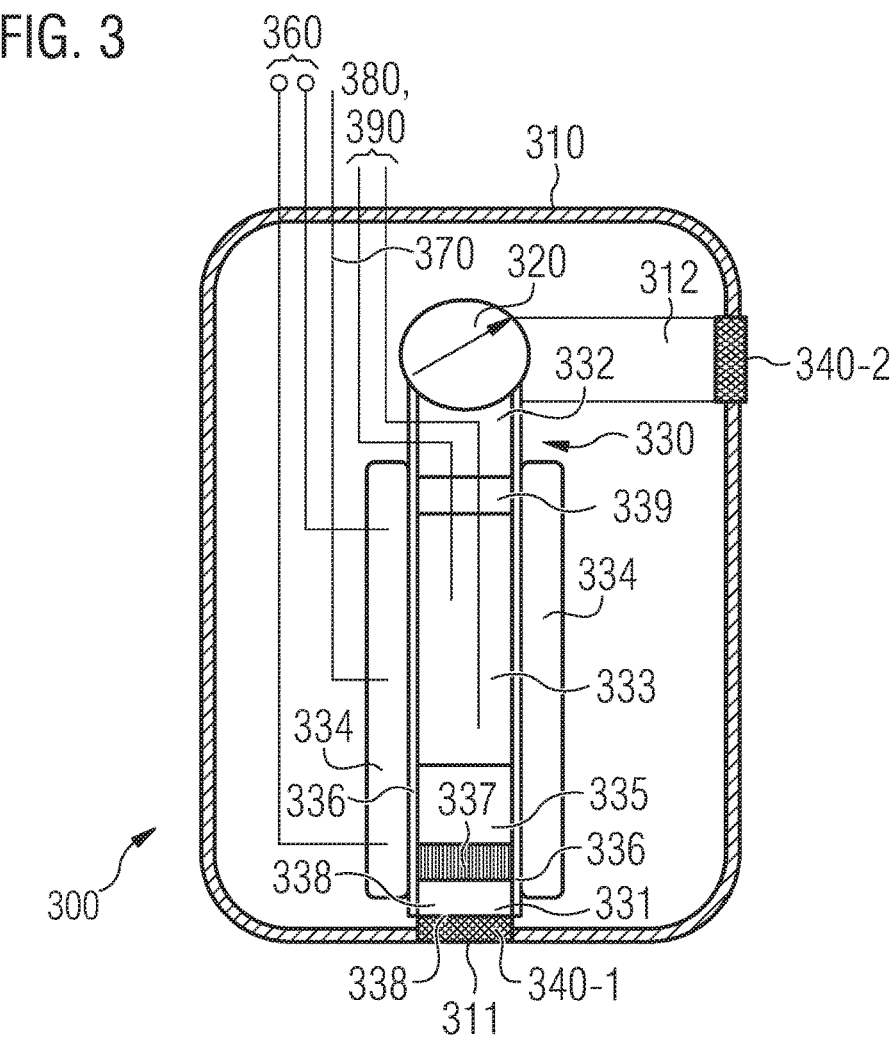
FIG. 3 is a sectional view showing another exemplary embodiment of a heat tone sensor.

Another heat tone sensor 300 is shown in FIG. 3. The heat tone sensor 300 comprises a housing 310 with a gas inlet 311 and with a gas outlet 312. The heat tone sensor 300 further comprises a device 320 for generating a gas stream of a gas to be tested between the gas inlet 311 and the gas outlet 312. The gas to be tested is suctioned via the gas inlet 311 directly from an ambient atmosphere surrounding the heat tone sensor 300. The device 320 for generating a gas stream may be configured, for example, in the form of a pump (e.g., piezo pump). The device 320 for generating a gas stream is coupled directly with a measuring element 330, so that the gas stream flows directly through this element. The measuring element 330 is configured to catalytically burn at least a portion of the gas stream.

The measuring element 330 comprises a tubular jacket 336 made of stainless steel or quartz glass (internal diameter of, e.g., between 3 mm and 7 mm) with an inlet opening 331 for the gas to be tested and with an outlet opening 332 for the gas to be tested. The device 320 for generating a gas stream directly adjoins the outlet opening 332 of the measuring element 330. A catalytically active material 333 is introduced into the jacket 336 for the catalytic combustion of the gas to be tested in an area between the inlet opening 331 and the outlet opening 332. Flame arresters 340-1 and 340-2 (e.g., a wire mesh or a sintered body) are also provided at the gas inlet 311 and at the gas outlet 312 of the housing in order to prevent the escape of flames. Furthermore, gas-permeable membranes or frits 337 and 339, respectively, are arranged in front of and after the catalytically active material 333 in order to admit the gases to be tested into the catalytically active material and at the same time to prevent an escape of the catalytically active material 333. In addition, porous, catalytically inactive material 335 is also arranged between the gas-permeable membrane or frit 337 and the catalytically active material 333.

The measuring element 330 further comprises a device 334 for heating at least a part of the jacket 336. The heating device 334 may be configured, e.g., as a ring heater. The heating device 334 may be configured, for example, to set a heat output based on a measured value of a temperature sensor 370. As is shown in FIG. 3, the temperature sensor 370 may be arranged on the jacket 336 (e.g., in the ring heater). As an alternative, the temperature sensor may also be arranged, for example, in the catalytically inactive material 335, which extends between the inlet opening 331 and the catalytically active material 333. A temperature equalization zone consisting of the porous, catalytically inactive material 335 can be created by the heating device 334 in the flow path (gas path) of the gas to be tested after the gas-permeable membrane or fit 337. The temperature equalization zone ensures uniform heating of the gas to be tested. The arrangement of the temperature sensor in the catalytically inactive material 335 may be advantageous insofar as the heat output can be adapted more rapidly and accurately to temperature fluctuations of the entering gas and a more stable temperature of the gas to be tested can thus be guaranteed on entry into the catalytically active material 333. The compensation of temperature fluctuations of the gas to be tested can thus be improved. The heat output can be set, e.g., by means of actuating signals 360, which are sent by a control device to the heating device 334.

The gas to be tested is sent into the catalytically active material 333 only after the temperature equalization zone. The catalytically active material 333 is dimensioned sufficiently to bring about a complete catalytic reaction of the gas to be tested, which reaction is stable over the long term. The extension of the catalytically active material 333 along the flow path of the gas to be tested between the inlet opening 331 and the outlet opening 332 may be, for this purpose, e.g., at least 3 times, 5 times, 7 times or 10 times the extension of the catalytically active material 333 at right angles to the flow path (e.g., the length of the area of the jacket 336 that is filled with catalytically active material 333 may be 3 times, 5 times, 7 times or 10 times the diameter of the area of the jacket 336 filled with catalytically active material 333). Based on the long path of the product gases of the catalytic combustion through the catalytically active material 333, the heat tone, i.e., the quantity of released heat, can, moreover, be detected to a greater extent than in case of pellistor-like measuring elements, because the hot product gases interact to a sufficient extent with the catalytically active material 333 (e.g., catalytically active ceramic), as a result of which the determination of the heat tone can take place to an expanded extent. Furthermore, the stability of the catalytic activity can be improved and the substance-dependent deactivation thermal aging and/or poisoning can be delayed due to an excess quantity of catalytically active material 333. The measuring element 330 can therefore maintain a uniform sensitivity ratio over a long time even under adverse conditions (e.g., in case of exposure to toxic substances).

One or more temperature sensors are arranged in the catalytically active material 333 for detecting the heat tone. Two temperature sensors 380, 390 are arranged in the catalytically active material 333 in the example shown in FIG. 3. Based on a temperature of the catalytically active material 333 in the particular position of the temperature sensors 380 and 390, these sensors 380 and 390 send a respective measurement signal each. The use of a plurality of temperature sensors may be advantageous because a preferred reaction zone is preferably located in new measuring elements in the inlet area of the catalytically active material 333 (i.e., in an area of the catalytically active material 333 located close to the inlet opening 331). The location and the extension of the preferred reaction zone (i.e., of the area with maximum quantity of released heat) may, however, depend, among other things, on the substance or gas being tested. The spatial resolution of the temperature sensors 380, 390 can thus be used for the spatial resolution of the reaction zones and hence for distinguishing classes of substances. Based on deactivation of the catalytically active material 333 due to thermal aging and/or poisoning (e.g., for methane), the preferred reaction zone migrates, moreover, from the inlet area farther in the direction of the outlet area of the catalytically active material 333 (i.e., in an area of the catalytically active material 333 located close to the outlet opening 332). The use of a plurality of temperature sensors can thus make it possible to detect such a migration of the reaction zone. A warning can correspondingly be outputted about an imminent end of the useful life of the measuring element 330.

A plurality of options are available for heating the measuring element 330 and for measuring the quantity of heat released during the catalytic combustion. For example, the measuring element 330 may be regulated to a predefined temperature, as this is described above. As an alternative, the measuring element 330 may also be controlled to a constant heat output. The quantity of heat released during the catalytic combustion can correspondingly be determined, for example, from a temperature difference between a temperature measured by at least one of the temperature sensors 380 and 390, respectively, in the interior of the measuring element 330 and a desired temperature of the measuring element 330. As an alternative, an absolute temperature increase of the catalytically active material 333 can be determined by means of at least one of the temperature sensors 380 and 390, respectively. As an alternative, a reduced electrical power consumption for holding the temperature of the measuring element 330 or of the catalytically active material 333 can also be determined based on the heat tone reaction.

The catalytically active material 333 may optionally also be operated intermittently between different temperature levels. In other words, the heating device 334 may be configured to heat the catalytically active material 333 to a first predefined temperature at a first time and to heat the catalytically active material 333 to a second predefined temperature at a second time. Distinction can be made between different substances based on the substance-dependent catalysis start temperatures. For example, it is possible to detect hydrogen, which has a very low catalysis start temperature on precious metal catalysts. A correction of the measurement results obtained can make possible, for example, a more uniform sensitivity of the measuring element 330 with respect to hydrocarbons and hydrogen.

Further, the catalytically active material 333 can also be protected from poisoning by a pollutant prefilter 338.

The measuring element 330 may also be replaced in some embodiments by, e.g., a pellistor, which can catalytically react all combustible substances in the gas to be tested based on its large dimensioning.

To compensate environmental effects, it is additionally possible to use, as was already described above for further exemplary embodiments, e.g., a temperature and/or moisture sensor or even a conventional compensator with catalytically inactive material.

As an alternative, compensation of the environmental conditions may also be abandoned if, e.g., the catalytically active material 333 is controlled to a constant temperature by means of the heating device 334 and a temperature equalization zone is used with the catalytically inactive material 335 in front of the catalytically active material 333. The gas flowing in is thus heated to a constant temperature before entry into the reaction zone. Different ambient temperatures and humidities have no effect now on the measurement.

The measuring element 330 shown in FIG. 3 may be defined as a tubular reactor with a reactor bed consisting of catalytically active material 333.

The aspects and features that are described together with one or more of the examples and figures described in detail above may also be combined with one or more of the other examples in order to replace an identical feature of the other example or to additionally introduce the feature into the other example.

While specific embodiments of the invention have been shown and described in detail to illustrate the application of the principles of the invention, it will be understood that the invention may be embodied otherwise without departing from such principles.

What is claimed is:

1. A heat tone sensor comprising:
a housing with a gas inlet and with a gas outlet, the housing comprising a housing interior space;
a device for generating a gas stream, of a gas to be tested, between the gas inlet and the gas outlet, the device being arranged in the housing interior space; and
a measuring element around or through or both around and through which the gas stream flows, and which is configured to catalytically burn at least a portion of the gas stream and to send a measurement signal, which measurement signal indicates a quantity of heat being released in the catalytic combustion of at least a portion of the gas stream, the measuring element being arranged in the housing interior space between the gas inlet and the device, wherein a cross-sectional area of the gas inlet, at right angles to a flow direction of the gas stream, is larger than a cross-sectional area of the gas stream at right angles to the flow direction immediately before the measuring element is reached.

2. A heat tone sensor in accordance with claim 1, wherein the device for generating the gas stream is a pump.

3. A heat tone sensor in accordance with claim 2, wherein the pump comprises a diaphragm and at least one piezoelectric actuator, and wherein the piezoelectric actuator is configured to excite the diaphragm to vibrate to generate the gas stream.

4. A heat tone sensor in accordance with claim 1, wherein the gas to be tested is suctioned via the gas inlet directly from an ambient atmosphere surrounding the heat tone sensor, the measuring element being located upstream of the outlet with respect to a flow of the gas stream.

5. A heat tone sensor in accordance with claim 1, wherein the measuring element is configured to catalytically burn the gas stream completely within the measuring element, the measuring element being located at a spaced location from the gas inlet and the gas outlet, wherein the measuring element is located between the gas inlet and the gas outlet.

6. A heat tone sensor in accordance with claim 1, wherein the measuring element is configured such that the gas stream will flow through the measuring element.

7. A heat tone sensor in accordance with claim 1, further comprising a sensor configured to send a second measurement signal, which second measurement signal indicates a change in a predefined physical variable in an area surrounding the heat tone sensor.

8. A heat tone sensor in accordance with claim 1, further comprising an analyzing circuit configured to determine a concentration of at least one combustible substance in the gas to be tested relative to a lower explosion limit of a calibrating gas based on the measurement signal.

9. A heat tone sensor in accordance with claim 8, further comprising a sensor configured to send a second measurement signal, which second measurement signal indicates a change in a predefined physical variable in an area surrounding the heat tone sensor, wherein the analyzing circuit is further configured to determine the concentration of the at least one combustible substance in the gas to be tested based on the second measurement signal.

10. A heat tone sensor in accordance with claim 8, wherein:
the measuring element is configured to send at least one additional measurement signal, which at least one additional measurement signal indicates a quantity of heat released during the catalytic combustion;
the measurement signal and the at least one additional measurement signal are based on measurements in different positions in a catalytically active material of the measuring element; and
the analyzing circuit is further configured to determine an area of the measuring element with maximum quantity of released heat on the basis of the measurement signal and the at least one additional measurement signal.

11. A heat tone sensor in accordance with claim 1, wherein the measuring element is a pellistor.

12. A heat tone sensor in accordance with claim 1, wherein the measuring element comprises:
a jacket with an inlet opening for a gas to be tested and with an outlet opening for the gas being tested; and
a catalytically active material disposed in the jacket in an area between the inlet opening and the outlet opening.

13. A measuring element for a heat tone sensor, the measuring element comprising:
a jacket with an inlet opening for a gas to be tested and with an outlet opening for the gas being tested, the inlet opening and the outlet opening defining a portion of a flow path of the gas, the inlet opening being located at a spaced location from the outlet opening; and
a catalytically active material disposed in the jacket in an area between the inlet opening and the outlet opening, wherein an extension of the catalytically active material along a flow path of the gas to be tested, between the inlet opening and the outlet opening, is at least 3 times an extension of the catalytically active material at right angles to the flow path.

14. A measuring element in accordance with claim 13, wherein the jacket comprises a tubular configuration.

15. A measuring element in accordance with claim 13, wherein the jacket consists of stainless steel or quartz glass.

16. A measuring element in accordance with claim 13, further comprising a heating device for heating at least a part of the jacket.

17. A measuring element in accordance with claim 16, further comprising a temperature sensor arranged on the jacket or in a catalytically inactive material, wherein the heating device is configured to set a heat output based on a measured value of the temperature sensor, which extends between the inlet opening and the catalytically active material.

18. A measuring element in accordance with claim 16, wherein the heating device is configured to heat the catalytically active material at a first time to a first predefined temperature and to heat the catalytically active material at a second time to a second predefined temperature.

19. A measuring element in accordance with claim 13, further comprising at least one temperature sensor arranged in the catalytically active material and configured to send a measurement signal based on a temperature of the catalytically active material.

20. A heat tone sensor comprising:
a housing with a gas inlet and with a gas outlet, the housing comprising a housing interior space;
a device for generating a gas stream, of a gas to be tested, between the gas inlet and the gas outlet, the device being arranged in the housing interior space;
a measuring element around or through or both around and through which the gas stream flows, and which is configured to catalytically burn at least a portion of the gas stream and to send a measurement signal, which measurement signal indicates a quantity of heat being released in the catalytic combustion of at least a portion of the gas stream, the measuring element being arranged in the housing interior space between the gas inlet and the device; and
an analyzing circuit configured to determine a concentration of at least one combustible substance in the gas to be tested relative to a lower explosion limit of a calibrating gas based on the measurement signal, wherein:
the measuring element is configured to send at least one additional measurement signal, which at least one additional measurement signal indicates a quantity of heat released during the catalytic combustion;
the measurement signal and the at least one additional measurement signal are based on measurements in different positions in a catalytically active material of the measuring element; and
the analyzing circuit is further configured to determine an area of the measuring element with maximum quantity of released heat on the basis of the measurement signal and the at least one additional measurement signal.

* * * * *